(12) United States Patent
Patzelt et al.

(10) Patent No.: US 7,798,450 B2
(45) Date of Patent: Sep. 21, 2010

(54) SUPPORT STRUCTURE FOR A RETRACTABLE AND EXTENDABLE FLAP, AND USE OF SAID STRUCTURE

(75) Inventors: Aicke Patzelt, Augsburg (DE); Michael Reiprich, Augsburg (DE); Gunther Stegmaier, Augsburg (DE); Wietse Wiglema, Friedberg (DE)

(73) Assignee: MT Aerospace AG, Augsburg (DE)

( * ) Notice: Subject to any disclaimer, the term of this patent is extended or adjusted under 35 U.S.C. 154(b) by 1071 days.

(21) Appl. No.: 10/569,487

(22) PCT Filed: Aug. 5, 2004

(86) PCT No.: PCT/EP2004/008784

§ 371 (c)(1),
(2), (4) Date: Jul. 24, 2006

(87) PCT Pub. No.: WO2005/021375

PCT Pub. Date: Mar. 10, 2005

(65) Prior Publication Data

US 2008/0169383 A1    Jul. 17, 2008

(30) Foreign Application Priority Data

Aug. 25, 2003 (DE) ............................... 103 39 030

(51) Int. Cl.
*B64C 9/28* (2006.01)

(52) U.S. Cl. .................... 244/211; 244/212; 244/215

(58) Field of Classification Search ................. 244/211, 244/212, 215, 213, 214, 216, 130
See application file for complete search history.

(56) References Cited

U.S. PATENT DOCUMENTS

| 3,768,760 A | 10/1973 | Jensen |
| 4,248,395 A | 2/1981 | Cole |
| 4,854,528 A | 8/1989 | Hofrichter |
| 5,230,487 A | 7/1993 | Gartelmann et al. |
| 5,788,190 A * | 8/1998 | Siers .......................... 244/212 |
| 6,432,507 B1 | 8/2002 | Brick et al. |

FOREIGN PATENT DOCUMENTS

| DE | 26 11 918 A1 | 11/1976 |
| DE | 36 41 247 A1 | 6/1988 |
| DE | 41 07 556 C1 | 5/1992 |
| DE | 196 37 483 A | 3/1998 |
| EP | 0 838 394 A | 4/1998 |
| EP | 0 838 394 A2 | 4/1998 |

* cited by examiner

*Primary Examiner*—J. Woodrow Eldred
(74) *Attorney, Agent, or Firm*—Rothwell, Figg, Ernst & Manbeck, p.c.

(57) ABSTRACT

The invention relates to a support structure for a retractable and extendable flap (12) associated with an object (14), surrounded by a flowing fluid, comprising a shell profile (16) that has a fluid/aerodynamic low-drag form on the outer side and on the inner side forms a chamber (18) for at least partially receiving a device (20) for retracting and extending the flap (12).

38 Claims, 5 Drawing Sheets

Figure 1:
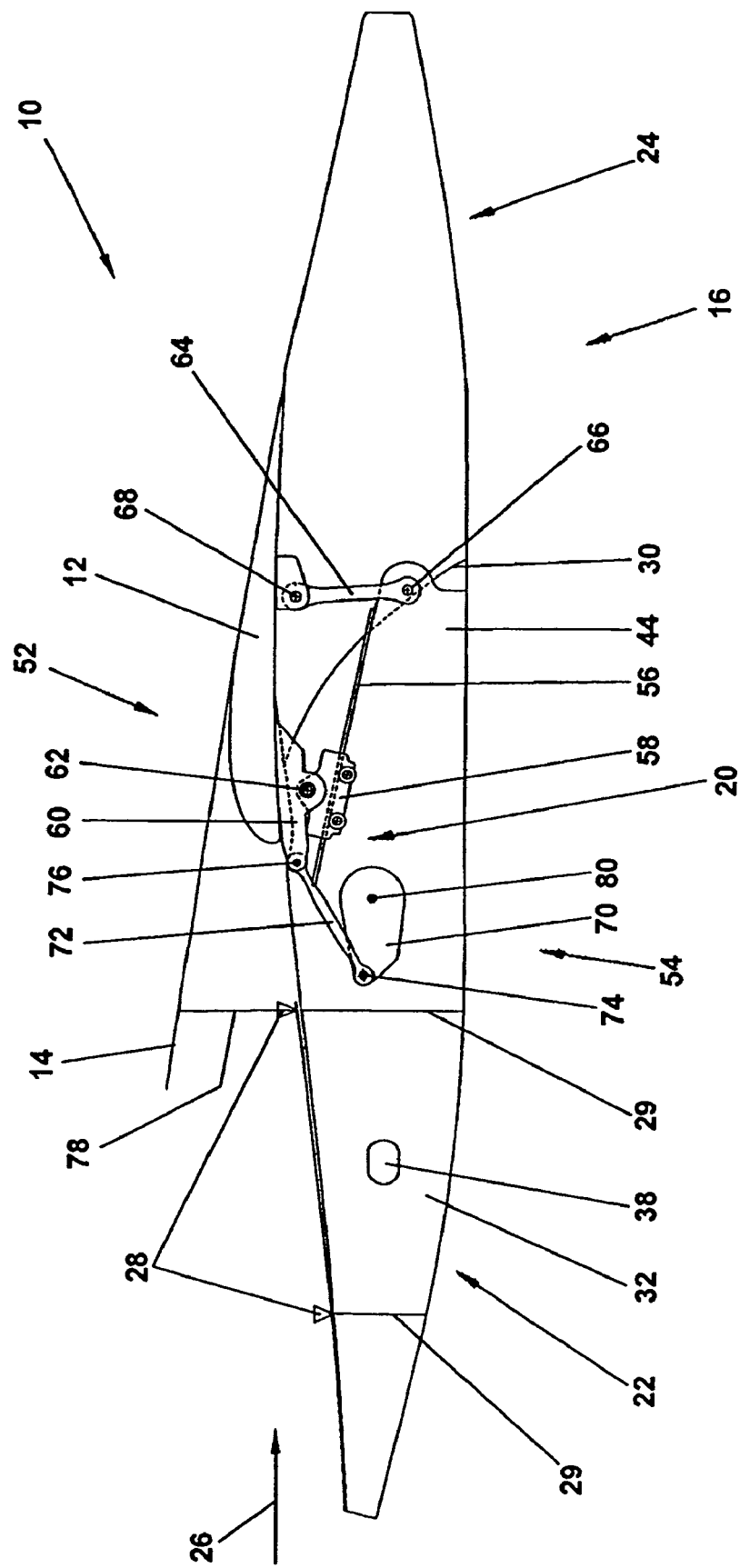

SUPPORT STRUCTURE FOR A RETRACTABLE AND EXTENDABLE FLAP, AND USE OF SAID STRUCTURE

CROSS REFERENCE TO RELATED APPLICATION

This application is a 35 USC §371 National Phase Entry Application from PCT/EP2004/008784, filed Aug. 5, 2004, and designating the United States.

This invention relates to a support structure for a retractable and extendable flap that is associated with an object surrounded by a flowing liquid, and use of said structure.

Support structures of this kind are generally known. In accordance with prior art, such support structures are, for example, used for landing and trailing edge flaps or flaps of commercial and transport aircraft that are mounted on their mainplanes. The landing flap supports are provided for extending and retracting the landing flaps during takeoff and landing to increase lift. Such landing flap supports consist, for example, of a housing with a single-part C-shaped cross-section of cast aluminum, the side walls of which are reinforced with ribs. For example, such a landing flap support is described in DE 41 07 556 C1. Landing flap supports of this kind have, however, proved in practice to have distinct disadvantages due to their structural design. On one hand landing flap support structures of this kind have an impermissible high drag and are therefore enclosed by an additional aerodynamically favorable fairing. On the other hand, such landing flap supports result not least in a number of additional components, and thus an increased weight and are relatively large in size, which in turn increases drag and thus has an overall unfavorable effect on the fuel consumption of the aircraft.

The object of this invention is therefore to provide a support structure for a retractable and extendable flap, associated with an object surrounded by a flowing fluid, by means of which the aforementioned disadvantages can be prevented, is therefore structurally particularly simple, compact and stable at the same time, is consequently relatively light and decidedly small, and also enables a substantial reduction in drag and thus of fuel consumption, for example of aircraft, and to facilitate its use.

This object is achieved, with regard to a device, in a surprisingly simple manner by the features of claim 1.

By means of the embodiment of this support structure in accordance with the invention for a retractable and extendable flap, associated with an object, surrounded by a flowing fluid, characterized in that the support structure is a shell profile, that takes at least part of the forces acting on the flap and transfers these to the object, that on the outer side has a fluid/aerodynamic low-drag form and on the inner side forms a device for retracting and extending the flap, a particularly simple support structure, that also itself achieves a compact, stable construction. Thus, the shell profile on one hand is fluid/aerodynamically optimized on the outside and on the other hand has a chamber or volume or installation space on the inside in which the device for retracting and extending the flap can be either completely or if necessary only partially, including the kinematic guide device or kinematic device and/or drive device or actuator, integrally received or accommodated. Also, all the structural elements such as for example fittings, bearing points, stringers or ribs for reinforcing and/or attaching this support structure in accordance with the invention to the object, for example to a mainplane of an aircraft, can be integrated without difficulty into the shell profile itself. Consequently, the support structure in accordance with the invention has a far fewer number of components. Especially, a separate fluid/aerodynamic fairing, such as for example on previous landing flap supports, is no longer necessary. The support structure in accordance with the invention is therefore distinguished by the integration of various functions, such as fluid/aerodynamic and mechanical structure features in a single unit, for which previously a number of components was necessary. Therefore, the weight and cross section of the support structure in accordance with the invention can be substantially reduced. In this way, the drag of the support structure in accordance with the invention, and thus, for example, fuel consumption of air transport aircraft, is overall noticeably reduced. Not least, the support structure in accordance with the invention enables a substantially improved and optimized design due to the interaction of the aforementioned advantages. By reducing the weight and size, an increased versatility can be achieved when realizing various designs, for example also with the inclusion of all usual drive devices or actuators. Finally, the support structure in accordance with the invention has the particular advantage of an increased fail safety and damage tolerance due to redundant load paths.

Further advantageous details of the support structure in accordance with the invention are described in claims 2 to 28.

Of particularly great importance for the maintenance of the function of flaps on the object surrounded by a flowing fluid, for example a landing flap on the mainplane of an aircraft, is that the shell profile, that has fluid/aerodynamic shape on the outer side, is of two-part design in accordance with claim 2.

For this purpose, the shell profile, that has a fluid/aerodynamic form on the outer side, has, in accordance with the features of claim 3, advantageously a front shell and a rear shell that are arranged one behind the other and against the direction of flow of the fluid.

To preclude any additional fluid/aerodynamic drag in the area of the separation point, or at least to minimize it, the front shell and the rear shell of the shell profile, that has a fluid/aerodynamic form on the outer side, forms a fluidic unit in accordance with claim 4 when the flap is retracted.

Advantageously, the front shell and the rear shell of the shell profile, that has a fluid/aerodynamic form on the outer side, can, in accordance with claim 5, move relative to each other corresponding to a retracted or extended state of the flap.

Furthermore, it is within the framework of the invention, corresponding to the features of claim 6, to attach the front shell of the shell profile, that has a fluid/aerodynamic form on the outer side, to the object and the rear shell of same to the flap.

Appropriately, the front shell and/or the rear shell of the shell profile, that has a fluid/aerodynamic form on the outer side, is/are in this connection, in accordance with claim 7, attached via discrete or continuous fittings or similar attaching elements to the object or to the flap.

Alternatively, or in addition to, the front shell and/or the rear shell of the shell profile, that has a fluid/aerodynamic form on the outer side, is/are fitted to the object or to the flap, corresponding to the measures of claim 8, by means of linear and/or flat fittings or similar attaching elements.

Of particular interest for a reduction in the overall height of the support structure in accordance with the invention and a reduction in its overall drag, are the measures of claim 9. According to these, the fittings or similar attaching parts are arranged within the chamber to receive, at least partially, the device for retraction and/or extension of the flap.

Furthermore, it is within the framework of the invention to form the front shell and/or the rear shell of the shell profile, that has a fluid/aerodynamic form on the outer side, as a single or multipart component, in accordance with claim 10. On one hand, this additionally enables a weight saving to be achieved and on the other hand it ensures an overall high damage tolerance and stability of the support structure in accordance with the invention.

For a further weight optimization of the support structure in accordance with the invention, the measures of claim 11 are of particular interest, whereby the front shell and/or the rear shell of the shell profile, that has a fluid/aerodynamic form on the outer side, is/are either of a complete or partial sandwich construction and/or composite construction.

The features of claim 12 contribute further to an improvement in the stability and compactness of the support structure in accordance with the invention. Accordingly, the front shell and/or rear shell of the shell profile, that has a fluid/aerodynamic form on the outer side, is/are provided with stiffeners, particularly longitudinal or transverse stiffeners. These can, for example, be thickeners, doublers, profiles, ribs or frames.

In an advantageous manner, the stiffeners, particularly longitudinal and/or transverse stiffeners, are arranged in this connection in accordance with claim 13 within the chamber to at least partially receive the device for retracting or extending the flap. In this way, the particularly favorable drag of the support structure in accordance with the invention remains unaffected.

Furthermore, it is within the framework of the invention that the front shell and/or the rear shell of the shell profile, that has a fluid/aerodynamic form on the outer side, is/are formed in accordance with the structural features of claim 14 from an essentially U-shaped outer shell and from side and/or inner and/or outer intermediate walls contained by the outer shell, and, if necessary, a closing cover.

To facilitate inspection, servicing and repairs, and also assembly and dismantling of the devices fitted in the chamber of the shell profile for extending and retracting the flap, the front shell and/or rear shell of the shell profile, that has a fluid/aerodynamic form on the outer side, is/are provided with at least one opening in accordance with claim 15, that can be closed by a cover or similar hand-hole cover.

In a preferred manner, the front shell and/or the rear shell of the shell profile, that has a fluid/aerodynamic form on the outer side, in accordance with the measures of claim 16, is/are, each completely or partly, made of plastic, particularly fiber-reinforced plastic, and/or fiber compound material and/or metal material, particularly steel, titanium, aluminum or an alloy of same, and/or a combination of same. For a support structure in accordance with the invention, fiber compound materials, that can be processed in accordance with all usual production methods, such as hand laminate, Preprag, resin infusion, resin injection, including bonded or bolted joints, etc., are favorable with regard to weight optimization. Basically, the support structure in accordance with the invention can also be made of metal materials, with reduction methods such as stretch forming of panels, fine casting, welding, riveting or bonding being common and preferred. Finally, it is also particularly advantageous in the event of damage that repairs can be carried out directly on the object without dismantling, for example, on the aircraft. This is called in-field repair, which can be simplified by the design and by choosing common materials and suitable production methods.

The features of claim 17 serve to avoid electrostatic discharge of the support structure in accordance with the invention, due to friction or lightening strike. Accordingly, the front shell and/or the rear shell of the shell profile, that has a fluid/aerodynamic form on the outer side, is/are covered by a coating that has an electrically conducting and/or antistatic effect. These measures are advantageous, particularly where fiber composite substances, or other non-conducting material, are used, with conducting surface coatings, for example, metal mesh or antistatic paint, being applied.

In an alternative or additional embodiment of the invention, the front shell and/or the rear shell of the shell profile, that has a fluid/aerodynamic form on the outer side, is/are provided with a coating in accordance with claim 18 that is resistant to shock and/or impact stresses, for example, due to grazing by foreign objects such as flocks of birds, etc.

In order, furthermore, to be able to detect critical damage due to impact with such foreign objects in a good time and, in particular, reliably, it is further intended in accordance with the invention to provide the front shell and/or the rear shell of the shell profile, that has a fluid/aerodynamic form on the outer side, in accordance with claim 19 with a coating that makes changes to the surface or damage visible, for example, during pre-flight visual inspections. During such visual inspections, changes and/or even damage to the surface finish of the shell profile, particularly a shell profile that has been painted, can be easily determined. The use of non-destructive material testing or a health monitoring system, as it is called, is also conceivable in this connection.

Of particular significance for a simple, yet compact and reliable construction of the complete support structure in accordance with the invention are the measures of claim 20. Accordingly, the device for extending and retracting the flap, fitted in the chamber or volume or installation space of the shell profile, that has a fluid/aerodynamic form on the outer side, on one hand has a kinematic guiding device or kinematic device and on the other hand at least partially a driving device or actuating system.

In this connection, the kinematic guiding device or kinematic device is advantageously in accordance with claim 21 provided with a guide rail, that is associated with the front shell, and a roller carriage that can move backwards and forwards on the guide rail. Furthermore, the kinematic guiding device or kinematic device has a connecting element, that is attached to the flap and hinge-mounted to the roller carriage, and a control lever that is also swivel-connected to the front shell and the flap.

Appropriately, the guide rail associated with the front shell can be detachably connected to the front shell in accordance with claim 22 or as a mechanical or form fit in accordance with claim 23.

Corresponding to claim 24, it is advantageously provided that the guide rail associated with the front shell consists of metal, particularly high-quality material, for example, in accordance with DIN 10083, or wear-resistant steel, preferably of titanium or a titanium alloy.

Of particular interest for a simple, yet compact and reliable construction of the support structure in accordance with the invention are also the measures in accordance with claim 25, that include the driving device or actuating system, a driving element or an actuator and a drive rod that in each case is swivel-connected to the driving element or actuator and the connecting element of the flap.

In principle, it is provided, as expressed in claim 26, that the driving element or actuator of the driving device or actuating system be integrated into the shell profile, that has a fluid/aerodynamic form on the outer side. Alternatively, it is also conceivable that the driving element or actuator of the driving device or actuator system in accordance with claim 27 is also attached outside the shell profile. For example, the driving element or actuator could be mounted on the object surrounded by a flowing fluid, for example, a mainplane of an aircraft.

Furthermore, it is within the framework of the invention to further optimize the support structure in accordance with the invention so that, in accordance with claim 28, at least one additional subsystem or at least one further device, particularly a fuel jettison system or a ram air turbine, can be installed in the chamber for at least partially receiving a device for the retracting and extending the flap.

Finally it is also within the framework of the invention to use the support structure in accordance with claim 29 for a landing flap or trailing-edge flap arranged on a mainplane of an aircraft. The use of the support structure in accordance with the invention has also shown itself to be particularly advantageous for a comparative flap of a submarine, a hovercraft or other aerospace aircraft. Finally, the support structure in accordance with the invention is also suitable for a corresponding flap of a flexible flow guidance device in a water/wind tunnel.

Further features, advantages and details of the invention are contained in the following description of a preferred form of embodiment of the invention, with the aid of drawings. The drawings are as follows:

FIG. 1 A schematic side view of a form of embodiment of a support structure in accordance with the invention, together with a landing or trailing-edge flap on a mainplane of an aircraft, shown in the retracted or cruising flight configuration.

Figure 2:
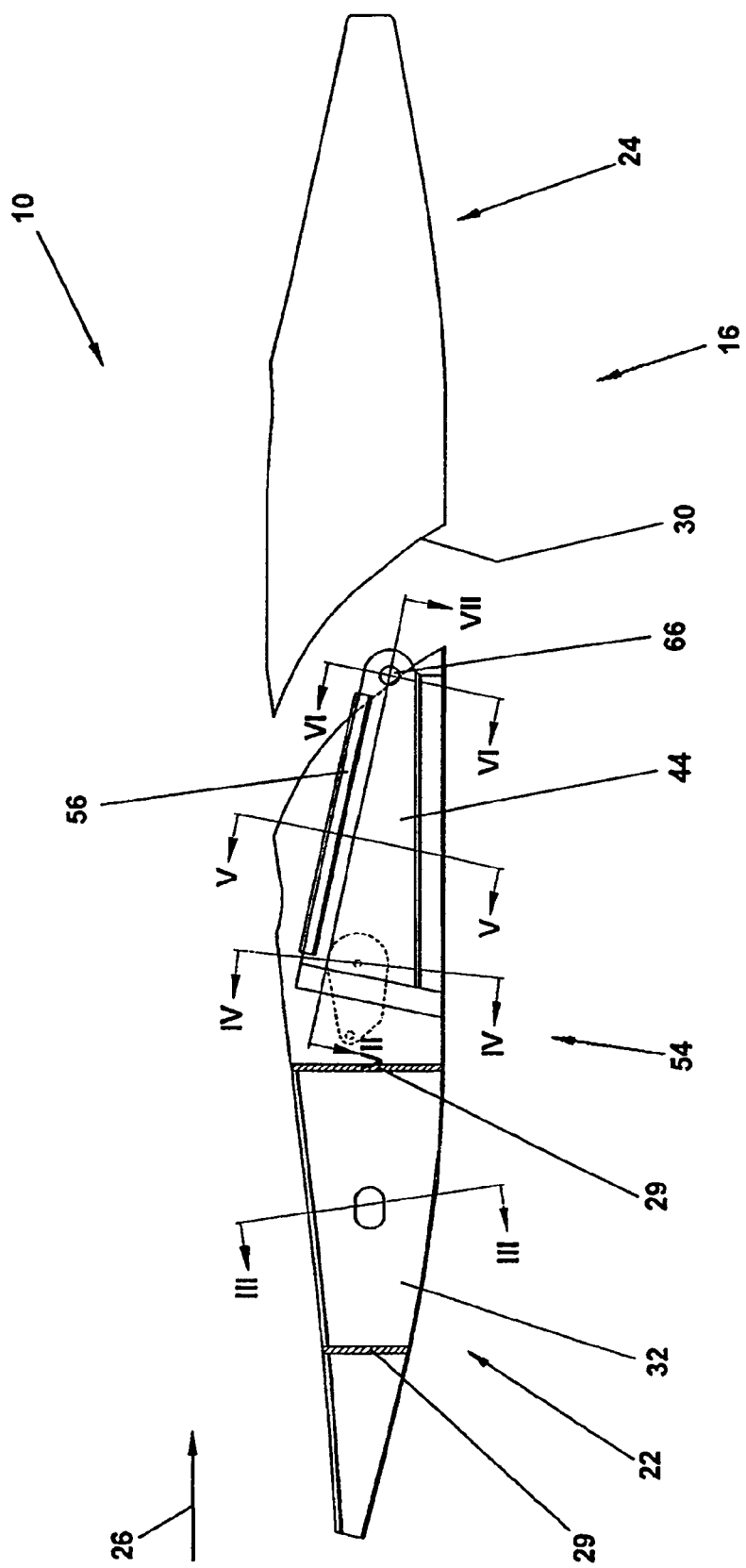

FIG. 2 A schematic, exploded lengthwise section view through the form of embodiment of support structure in accordance with the invention shown in FIG. 1, without a landing or trailing-edge flap.

Figure 3:
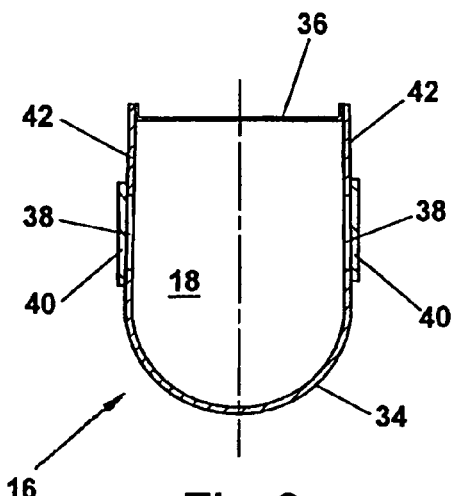

FIG. 3 A transverse section view through the form of embodiment of the support structure in accordance with the invention along line III-III in FIG. 2.

Figure 4:
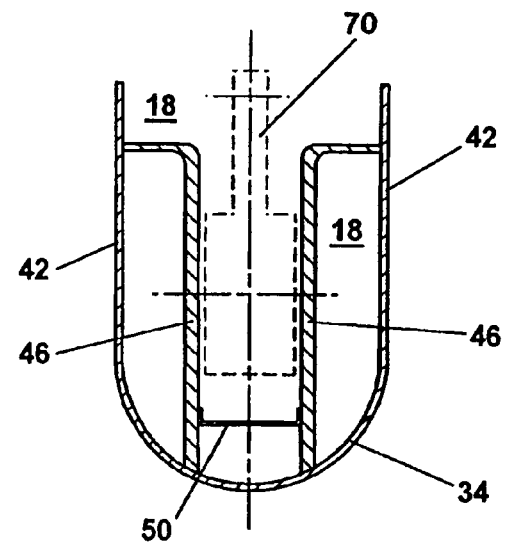

FIG. 4 A transverse section view through the form of embodiment of the support structure in accordance with the invention along line IV-IV in FIG. 2.

Figure 5:
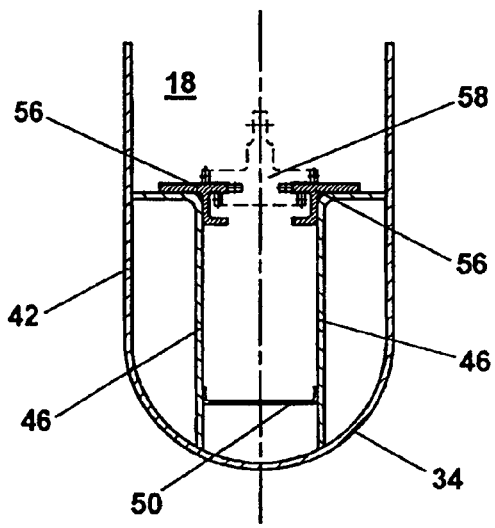

FIG. 5 A transverse section view through the form of embodiment of the support structure in accordance with the invention along line V-V in FIG. 2.

Figure 6:
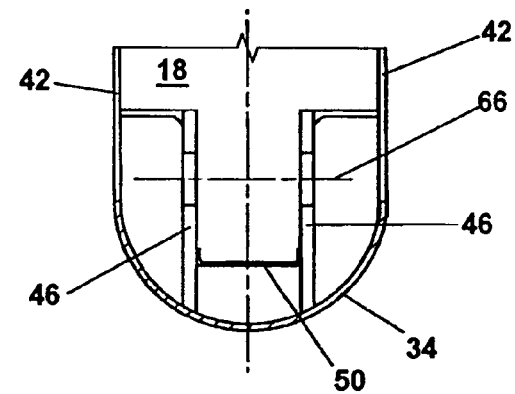

FIG. 6 A transverse section view through the form of embodiment of the support structure in accordance with the invention along line VI-VI in FIG. 2.

Figure 7:
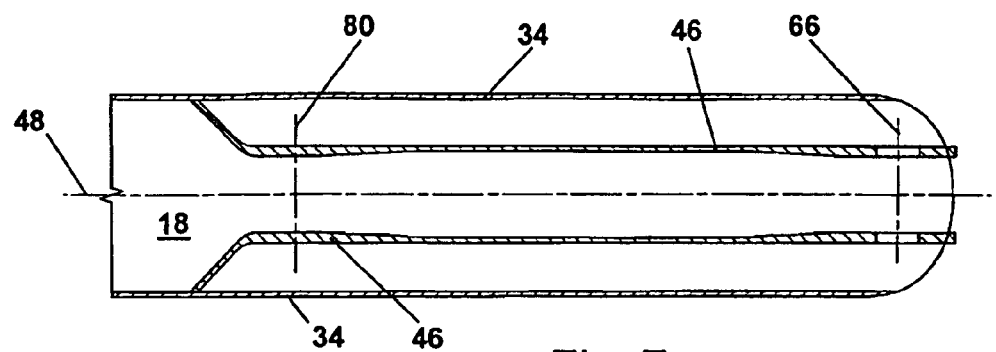

FIG. 7 A lengthwise section view through the form of embodiment of the support structure in accordance with the invention along line VII-VII in FIG. 2.

Figure 8:
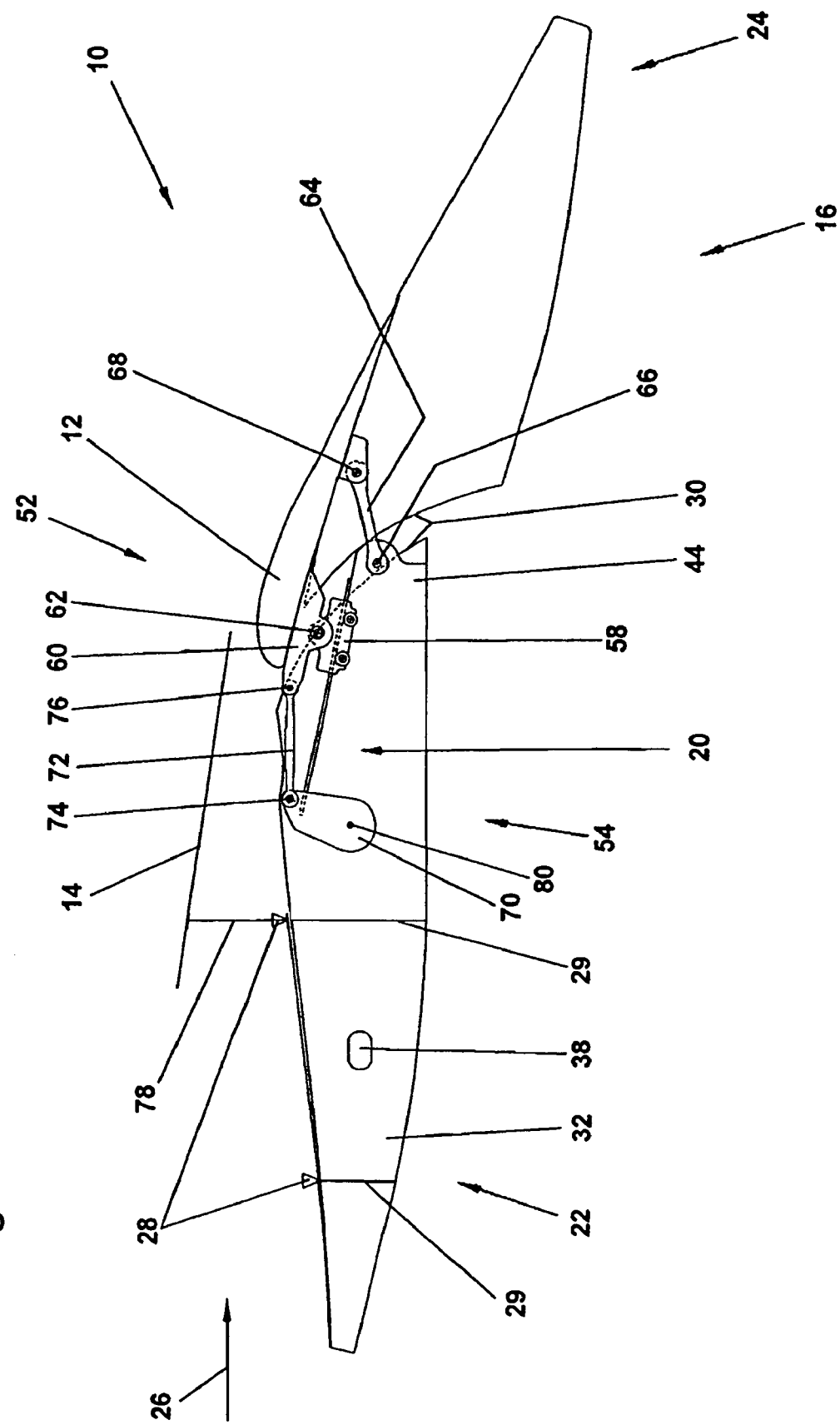
Figure 9:
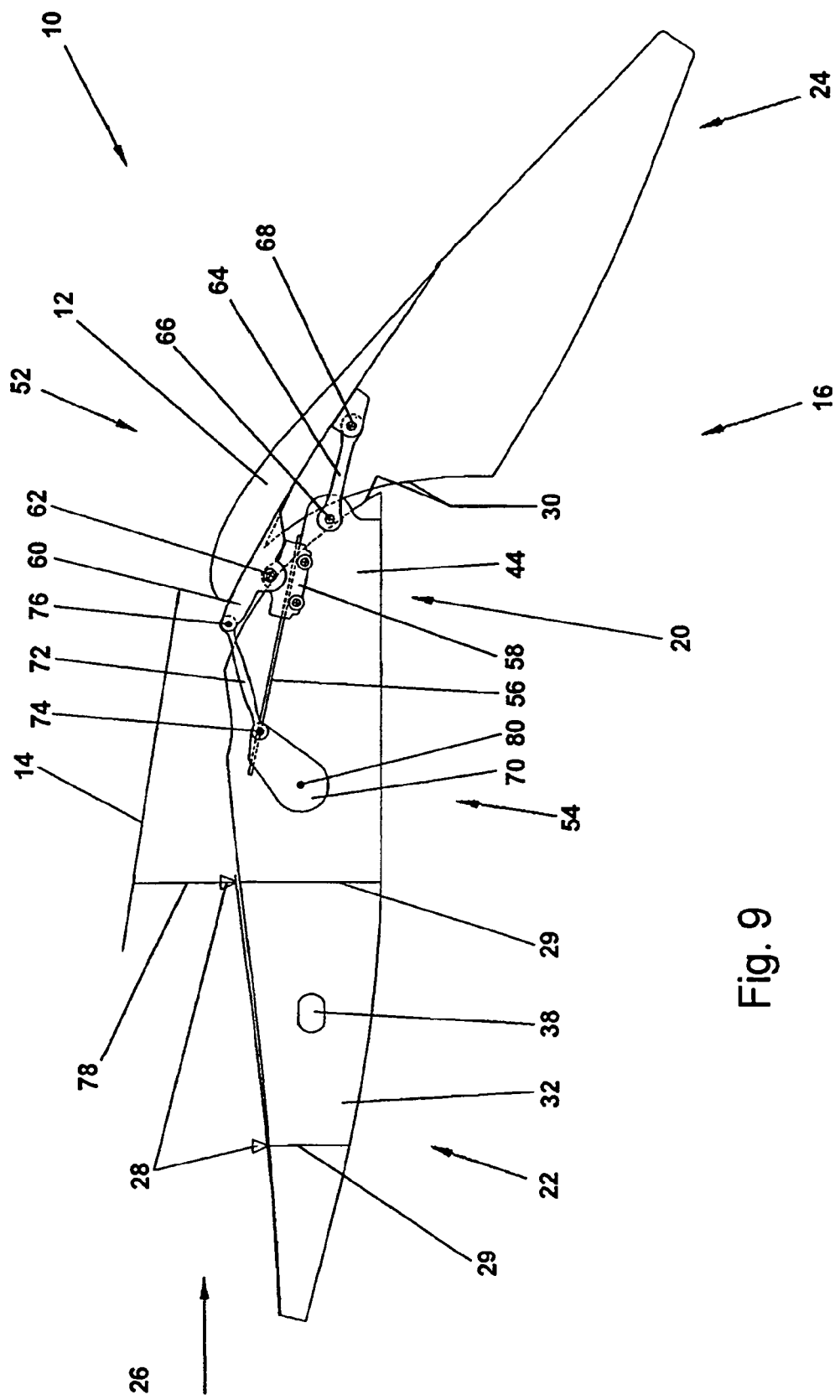

FIG. 8 A schematic side view of the form of embodiment of the support structure in accordance with the invention for a landing or trailing-edge flap on a mainplane of an aircraft corresponding to FIG. 1, in the partly extended state, or take-off Fowler configuration, and FIG. 9 A schematic side view of the form of embodiment of the support structure in accordance with the invention for a landing or trailing-edge flap on a mainplane of an aircraft, corresponding to FIG. 1, in the completely extended state or landing configuration.

In the following description of a form of embodiment of a support structure 10 in accordance with the invention for a flap 12, associated with an object 14 surrounded by flowing fluid and that can be retracted and extended, similar components that correspond to each other are in each case provided with identical reference characters.

The support structure 10 in accordance with the invention can be used in an advantageous manner for a flap 12 in the form of a landing flap or trailing-edge flap, that is arranged on an object in the form of a mainplane 14 of an aircraft or other air/water craft of any kind. In this connection, it has been shown to be particularly advantageous if the support structure 10 in accordance with the invention is used for civil and military passenger aircraft and transport aircraft.

Equally, the support structure 10 in accordance with the invention is suitable for use for any flap surrounded by flowing fluid with equal or similar flap kinematics, particularly of a submarine, a hovercraft or an aerospace aircraft. The support structure 10 in accordance with the invention can furthermore not just be used only in dynamic systems, but also can be used equally well in static systems, such as a flexible flow guidance device in a water/wind tunnel or similar.

For simplicity, the support structure 10 in accordance with the invention, designed for a flap 12 that is associated with an object 14 surrounded by a flowing fluid and can be retracted and extended, is described in the following using a landing flap of an aircraft. The example of an embodiment of a support structure 10 in accordance with the invention is thus a "landing flap support". To this extent, the very general descriptions "flap" and "object" are used with the example of an embodiment in the sense of the technical terms "landing flap", "trailing-edge flap" or flap and "wing" or "mainplane" of an aircraft, without the invention being limited by this.

The support structure 10 in accordance with the invention has a shell profile 16 as shown in FIGS. 1 to 9.

The shell profile 16 has a fluid/aerodynamic form on the outer side. Thus, the shell profile 16 has a decidedly low fluid or aerodynamic resistance to flow, a decidedly low aerodynamic drag in the case of the described embodiment of the support structure 10 in accordance with the invention.

The shell profile 16 has a chamber or similar volume or installation space or other cavity 18 on the inner side. The chamber 18 at least partially receives a device 20 for the retraction and extension of the landing flap 12. In an advantageous manner, the complete mechanical architecture, such as mainly the device for retracting and extending the landing flap 14, other structural elements, for example, fittings, bearing points, stringers or ribs, etc., are thus integrally accommodated in the chamber 18.

The shell profile 16 is formed in two parts. Thus, the shell profile 16 has a front shell 22 and a rear shell 24. The front shell 22 and rear shell 24 are arranged one behind the other against the direction of flow of the fluid (arrow 26).

The front shell 22 and rear shell 24 of the shell profile 16 can move relative to each other corresponding to the retracted or extended state of the landing flap 12. The front shell 22 of the shell profile 16, and thus the complete support structure 10 in accordance with the invention, are at the same time attached to the object or mainplane 14 by means of bearing points 28, to which front or rear force application ribs 29 on the support structure 10 are assigned. The rear shell 24 of the shell profile 16 is, on the contrary, attached to the landing flap 12.

For the purpose of attaching the front shell 22 and/or rear shell 24, discrete or continuous fittings or similar attaching elements (not shown in detail) are provided, depending upon the design of the mainplane 14 and landing flap 12. Alternatively, or in addition, the fittings or similar attaching elements can also be of a linear and/or flat shape.

In order not to negatively influence the fluid/aerodynamic form of the shell profile 16, the fittings or similar attaching elements are accommodated in an advantageous manner within the chamber 18, that is provided to at least partially receive the device 20 for the retraction and extension of the landing flap 12.

At the same time, the front shell 22 and rear shell 24 of the shell profile 16 are each matched to the associated contour of the mainplane 14 or landing flap 12, if necessary by using sealing sleeves (also not shown individually). The functioning of the support structure 10 in accordance with the invention and of the landing flap 12 is not impaired by this.

The function of the front shell 22 of the shell profile 16 is to take the fluid or air forces that occur with this form of embodiment of the support structure 10 in accordance with the invention and to introduce these in the form of bearing-reaction forces into the mainplane 14 and thus into the complete aircraft. The rear shell 24 of the shell profile 16, on the other hand, has a largely purely fluidic function without significant force reception, force introduction or force transmission.

As can be seen, especially in FIGS. 1, 8 and 9, the front shell 22 and the rear shell 24 of the shell profile 16 are divided at a separation line or separation joint or at separation points 30. The separation line 30 is chosen in such a way that a collision between the front shell 22 and rear shell 24 when the landing flap 12 is retracting or extending is prevented. The design of the separating line 30 between the front shell 22 and rear shell 24 of the shell profile 16 depends mainly on the shape of the landing flap 12 itself, of the positions and of the extending curve of the landing flap 12.

The front shell 22 and the rear shell 24 of the shell profile 16, that has a fluid/aerodynamic form on the outer side, also forms a fluidic unit without any additional fluid/aerodynamic resistance when the landing flap 12 is retracted. The front shell 22 and the rear shell 24 are therefore designed when in contact with each other to be matched to each other with regard to shape, cross-section and dimensions, in such a way that the front shell 22 and rear shell 24 close tightly against each other or engage in each other when the landing flap 12 is retracted or in the cruise configuration. The front shell 22, permanently attached to the mainplane 14, of the shell profile 16 terminates at the separating line 30, whereas the rear shell 24 continues on, with the same cross-section, from the separating line 30. With the landing flap 12 retracted there is therefore no impermissible gap between the front shell 22 and the rear shell 24. The separating line 30 between the front shell 22 and the rear shell 24 can thus not induce any additional fluid/aerodynamic flow resistance.

A separation or division of this kind also enables negative flap angles at the end of the retraction operation/path (retraction over travel), without a collision between the support structure 10 in accordance with the invention and the landing flap 12 being possible.

Referring to FIG. 1 to 3, the front shell 22 and the rear shell 24 consist essentially of a U-shaped outer shell 34. The front shell 22 has an additional closing cover 36 in its front area 32 (FIG. 3).

Furthermore, the front shell 22 and/or the rear shell 24 of the shell profile 16 is/are provided with at least one opening 38. The opening(s) 38 can be closed by associated covers or similar hand-hole covers 40. With the illustrated form of embodiment of the support structure 10 in accordance with the invention, two openings 38 are provided opposite each other in the front area 32 of the front shell 22, as shown in FIGS. 1 to 3. This enables access to the inside of the front shell 22 for inspection, servicing or repairs, that, for example, are to be carried out on the mechanical architecture integrated into the chamber 18, or on parts of same. These openings are located, as shown in FIG. 3, in two side walls 42 of the outer shell 34 of the shell profile 16. As an alternative to such covers 40, conventional service flaps can also be provided. Inspection, servicing and repair can also be additionally facilitated by removing the rear shell 24 of the shell profile 16.

Without being shown in detail, vertical and/or horizontal supporting walls can be fitted centrally in the shell profile 16, in order to increase the damage tolerance in the event of shock and impact stresses.

In the rear area 44 of the front shell 22, two vertical internal walls 46 are also arranged, as shown in FIG. 1 and FIGS. 4 to 7, that run parallel to each other and extend symmetrically, laterally offset to the longitudinal axis 48 (FIG. 7) of the front shell 22. As shown in FIG. 7, in this case the two internal walls 46 extend beyond the separation line 30 between the front shell 22 and the rear shell 24 of the shell profile 16.

In the rear area 44 of the front shell 22, there is also, as shown in FIGS. 4 to 6, an intermediate wall 50 running in a horizontal direction, that serves to form a torsion box. A lateral arrangement of further intermediate walls is furthermore also possible (not illustrated).

In order to obtain a failsafe, damage-tolerant design of the support structure 10 in accordance with the invention that is also lightweight, the front shell 22 and/or the rear shell 24 of the shell profile 16 is/are designed to be single or multicell, with the multicell construction offering the higher damage tolerance in a manner more appropriate for a specialist. Such an arrangement can advantageously be realized particularly for the rear shell 24 of the shell profile 16, because it is required to take hardly any additional loads apart from its own weight and flow forces.

As an alternative or in addition to this, the front shell 22 and/or the rear shell 24 of the shell profile can be continuous or partial, i.e., have a sandwich construction and/or composite construction only locally if necessary.

Depending on special requirements, possible applications and particular load profiles, it is furthermore advantageous if the front shell 22 and/or the rear shell 24 of the shell profile 16 can either be self-supporting or provided with suitable stiffeners (also not shown individually), particularly longitudinal and/or lateral stiffeners, for example, in the form of thickeners, doublers, profiles, ribs or frames. In addition to such stiffeners, alternative load paths, for example, against damage due to shock and impact stresses, are also conceivable.

As can also be seen in FIGS. 1 and 2, the device 20, fitted in chamber 18 of the shell profile 16, for extending and retracting the landing flap 12 has a kinematic guiding device or kinematic device 52 and at least partially a driving device or actuating system 54.

With the form of embodiment of the support structure 10 in accordance with the invention shown in FIGS. 1 and 2, the kinematic guiding device or kinematic device 52 has a guide rail 56 assigned to the front shell 22 and a roller carriage 58.

As can be seen in FIG. 5, for the illustrated form of embodiment of the support structure 10 in accordance with the invention the guide rail 52 is of two-part design and is attached to the inner walls 46 of the front shell 22. A single-part or three-part design of the guide rail 56 is also conceivable.

The roller carriage 58 can be moved backwards and forwards on the guide rail 56. Furthermore, the kinematic guiding device or kinematic device 52 includes an attaching element 60 to which the landing flap 12 is fixed and to which the roller carriage 58 is connected. Thus, the landing flap 12 and the rear shell 24 of the shell profile 16 attached to the landing flap 12 are rotatably connected to the roller carriage 58 via a rotary bearing 62.

Finally, the kinematic guiding device or kinematic device 52 also has a control level 64 swivel-connected to the front shell 22 and the rear shell 24, or to the landing flap 12. Thus, the control level 64 is rotatably supported by the rotating bearing 66 of the front shell 22 and the rotating bearing 68 of the landing flap 12. As shown in FIG. 6, the rotating bearing 66 of the control lever 64, that is associated with the front shell 22 of the shell profile 16, is integrated into the inner walls 46 of the front shell 22.

For reasons of high stress, it has proved advantageous in practice to execute the longitudinal guidance of the landing flap 12 in a wear-resistant manner. Insofar, the guide rail 56, that is associated with the front shell 22, is made of metal, particularly high quality material, for example, in accordance with DIN 10083 or from a wear-resistant steel. In a particularly advantageous manner, the guide rail 56 is made of titanium alloy.

In order to furthermore simplify the servicing and repair of the support structure 10 in accordance with the invention, the guide rail 56, that is associated with the front shell 22, is detachably connected to the front shell 22, for example, by means of a mechanical and/or form fit.

As can also be seen from FIGS. 1 and 2, the driving device or actuating system 54 for the form of embodiment of the support structure 10 in accordance with the invention includes a drive element or actuator 70 and a drive rod 72.

As shown in FIG. 4, the drive element or actuator 70 for the form of embodiment of the support structure 10 in accordance with the invention is arranged centrally between the two inner walls 46 of the front shell 22.

The drive rod 72 is swivel-connected to the driving element or actuator 70 and the connecting element 60 of the landing flap 12. For this purpose, the drive rod 72 is rotatably supported by a rotary bearing 74 at the drive element or actuator 70 on the one hand and by a rotary bearing 76 at the connecting element 60 on the other hand. Because it is relatively simple with the form of embodiment of the support structure 10 in accordance with the invention, to position the drive element or actuator 70 in the shell profile 16 in any position required, i.e., for example, centrally or off-centre, a drive element or actuator 70 of any common type can be used. Accordingly, a hydraulic cylinder, a pushrod, a rotary gear, a screw or a rack can be used as a drive element or actuator 70, depending upon spatial conditions and/or technical requirements.

The drive element or actuator 70 is rotatably mounted on a rotary bearing 80 of the front shell 22 of the shell profile 16.

Although the support structure 10 in accordance with the invention is characterized by the ability to take large forces of the driving element or actuator 70 and the resulting reaction forces, it is basically still possible to have a design where the driving element or actuator 70 of the driving device 54 is installed outside the support structure 10 in accordance with the invention. Accordingly, the driving element or actuator 70 can, for example, be mounted on the rear spar 78 of the mainplane 14, surrounded by a flowing fluid, of the aircraft or on any other load bearing structure of the object 14.

The same or different materials can be chosen for the front shell 22 and the rear shell 24 of the shell profile. For weight optimization of the structure 10 in accordance with the invention, the front shell 22 and/or the rear shell 24 of the shell profile 16 is/are each made completely or partially of plastic, particularly fiber-reinforced plastic and/or metal material, particularly steel, aluminum or an alloy of same, and/or a combination of them. For fiber compound materials, those that can be processed using general, common production methods, such as hand laminate, Prepreg, resin infusion, resin injection including bonded or bolted joints are suitable. With regard to metal materials, those that can be processed using production methods such as stretch forming of panels, fine casting, welding, riveting and bonding are suitable. In addition, it is important in the event of damage that repairs are carried out directly on the object without dismantling, i.e., in this example of an embodiment directly on the aircraft. Such in-field repairs as they are called can usually be very simply carried out by selecting common materials and production methods.

In order to overcome electrostatic discharge, particularly due to friction or lightning strike, the front shell 22 and/or the rear shell 24 of the shell profile 16 is/are advantageously provided with a coating that has an electrical conducting and/or antistatic effect. If fiber composite materials or non-conducting materials are used, a coating such as metal mesh or antistatic paint should be applied. Alternatively or in addition, the front shell 22 or the rear shell 24 of the shell profile 16 is provided with a coating that is resistant to shock and impact stresses.

In order to reliably detect critical damage due to impact with foreign objects in good time, the front shell 22 and/or the rear shell 24 of the shell profile 16 is/are sometimes also provided with a coating that makes surface changes or damage visible. In this way, changes or damage to the surface finish can be detected by means of visual pre-flight inspections of the aircraft. In this connection, the use of non-destructive materials testing or a health monitoring system is also conceivable.

Without being shown in detail, the form of embodiment of the support structure 10 in accordance with the invention is also characterized in that at least one further device, particularly a subsystem such as a fuel jettison system or a ram air turbine is, or can be, mounted within the chamber 18 for at least partially receiving the device 20 for the retraction and extension of the landing flap 12. The versatility of the support structure 10 in accordance with the invention can thus be further improved.

The functioning of the support structure 10 in accordance with the invention is explained in more detail in the following with reference to FIGS. 1, 8 and 9:

By operating the driving element or actuator 70, the landing flap 12 is moved between the retracted state or cruise configuration as shown in FIG. 1, the partially extended state or take-off configuration as shown in FIG. 8 and the fully extended state or landing configuration as shown in FIG. 9. Any intermediate position is also equally possible.

When the driving element or actuator 70 is operated in the clockwise direction, the drive rod 72 drives the connecting element 60 and the landing flap 12 and moves the flap via the guide rail 56 and roller carriage 58 in the direction of the flow of the fluid in accordance with arrow 26 or against the take-off or flight direction. The angle of attack of the landing flap 12 is set in this case as a function of the angular position of the control lever 64. When the driving element or actuator 70 is operated counterclockwise, the landing flap 12 is correspondingly retracted.

This invention is not limited to the form of embodiment of the support structure 10 illustrated. It is thus possible without difficulty to use as a kinematic guiding device or kinematic device 52, a multilink (coupling rods) kinematic device or a combination of both instead of a linear guide via the guide rail 56 and roller carriage 58.

REFERENCE CHARACTER LIST

10 Support structure
12 Flap or landing or trailing-edge flap
14 Object or mainplane of an aircraft
16 Shell profile
18 Chamber or volume or installation space
20 Device for retracting or extending the flap
22 Front shell of the shell profile
24 Rear shell of the shell profile 26 Direction of flow of the fluid
28 Mounting points on the object or mainplane
29 Front and rear force introduction rib
30 Separation line or separation point between the front shell and the rear shell
32 Front area of the front shell
34 Outer shell
36 Closing cover
38 Opening(s)
40 Cover
42 Side wall
44 Rear area of the front shell
46 Inner wall of the front shell
48 Longitudinal axis of the front shell
50 Intermediate wall of the front shell
52 Kinematic guiding device or kinematic device
54 Driving device or actuator system
56 Guide rail
58 Roller carriage
60 Connecting element
62 Rotary bearing
64 Control lever
66 Rotary bearing
68 Rotary bearing
70 Driving element or actuator
72 Drive rod
74 Rotary bearing
76 Rotary bearing
78 Rear spar of the mainplane of the aircraft
80 Rotary bearing.

The invention claimed is:

1. Support structure for a retractable and extendable flap (12) associated with an object (14), surrounded by a flowing fluid, wherein the support structure (10) is a shell profile (16) that takes at least part of the forces acting on the flap (12) and transmits them to the object (14), that has a fluid/aerodynamic low-drag form on the outer side and on the inner side forms a chamber (18) for at least partially receiving a device (20) for retracting and extending the flap (12).

2. Support structure in accordance with claim 1, wherein the shell profile (16), that has a fluid/aerodynamic form on the outer side, is of two part-construction.

3. Support structure in accordance with claim 1, wherein the shell profile (16), that has a fluid/aerodynamic form on the outer side, includes a front shell (22) and a rear shell (24) that are arranged one behind the other against the direction of flow (arrow 26) of the fluid.

4. Support structure in accordance with claim 3, wherein the front shell (22) and the rear shell (24) of the shell profile (16), that has a fluid/aerodynamic form on the outer side, form a fluidic unit without fluid/aerodynamic flow resistance being induced by separation of the front shell (22) and the rear shell (24) when the flap (12) is retracted.

5. Support structure in accordance with claim 3, wherein the front shell (22) and the rear shell (24) of the shell profile (16), that has a fluid/aerodynamic form on the outer side, are movable relative to each other corresponding to the retracted or extended state of the flap (12).

6. Support structure in accordance with claim 3, wherein the front shell (22) of the shell profile (16), that has a fluid/aerodynamic form on the outer side, is attached to the object (14) and that the rear shell (24) is attached to the flap (12).

7. Support structure in accordance with claim 6, wherein the front shell (22) and/or the rear shell (24) of the shell profile (16), that has a fluid/aerodynamic form on the outer side, is/are attached to the object (14) and/or the flap (12) by means of discrete or continuous fittings.

8. Support structure in accordance with claim 6, wherein the front shell (22) and/or the rear shell (24) of the shell profile (16), that has a fluid/aerodynamic form on the outer side, is/are attached on the object (14) and/or on the flap (12) by means of fittings or attaching elements of linear and/or flat shape.

9. Support structure in accordance with claim 6, wherein the fittings or attaching elements are arranged within the chamber (18) for at least partially receiving the device (20) for retracting and extending the flap (12).

10. Support structure in accordance with claim 3, wherein the front shell (22) and/or the rear shell (24) of the shell profile (16), that has a fluid/aerodynamic form on the outer side, is/are of single-or multicell construction.

11. Support structure in accordance with claim 3, wherein the front shell and/or the rear shell (24) of the shell profile (16), that has a fluid/aerodynamic form on the outer side, is/are completely or partially of sandwich construction and/or composite construction.

12. Support structure in accordance with claim 3, wherein the front shell (22) and/or the rear shell (24) of the shell profile (16), that has a fluid/aerodynamic form on the outer side, is/are provided with stiffeners.

13. Support structure in accordance with claim 12, wherein the stiffeners are arranged within the chamber (18) for at least partially receiving the device (20) for retracting and extending the flap (12).

14. Support structure in accordance with claim 3, wherein the front shell (22) and/or the rear shell (24) of the shell profile (16), that has a fluid/aerodynamic form on the outer side, comprise(s) a U-shaped outer shell (34) having two side walls (42).

15. Support structure in accordance with claim 3, wherein the front shell (22) and/or the rear shell (24) of the shell profile (16), that has a fluid/aerodynamic form on the outer side, is/are provided with at least one opening (38), that can be covered by a cover (40), for inspection, servicing and repair purposes.

16. Support structure in accordance with 3, wherein the front shell (22) and/or the rear shell (24) of the shell profile (16), that has a fluid/aerodynamic form on the outer side, each consist(s) completely or partially of plastic and/or fiber composite material and/or metal material and/or a combination of these.

17. Support structure in accordance with claim 3, wherein the front shell (22) and/or rear shell (24) of the shell profile (16), that has a fluid/aerodynamic form on the outer side, is/are provided with a coating that has an electrical conducting and/or antistatic effect.

18. Support structure in accordance with claim 3, wherein the front shell (22) and/or the rear shell (24) of the shell profile (16), that has a fluid/aerodynamic form on the outer side, is/are provided with a coating that is resistant to shock and impact stresses.

19. Support structure in accordance with claim 3, wherein the front shell (22) and/or the rear shell (24) of the shell profile (16), that has a fluid/aerodynamic form on the outer side, is/are provided with a coating that makes surface changes or damage visible.

20. Support structure in accordance with claim 3, wherein a device (20) fitted in the chamber (18) of the shell profile (16), that has a fluid/aerodynamic form on the outer side, is for extending and retracting the flap (12), and includes a kinematic guiding device (52) and at least partially a driving device (54).

21. Support structure in accordance with claim 20, wherein the kinematic guiding device (52) includes:

a guide rail (56) associated with the front shell (22),
a roller carriage (58) that moves on the guide rail (56),
a connecting element (60) that is attached to the flap (12) and is attached to the roller carriage (58), and
a control lever (64) that is swivel-connected to the front shell (22) and the flap (12).

22. Support structure in accordance with claim 21, wherein the guide rail (56) associated with the front shell (22) is detachably connected to the front shell (22).

23. Support structure in accordance with claim 21, wherein the guide rail (56) associated with the front shell (22) is connected to the front rail by means of a mechanical or form fit.

24. Support structure in accordance with claim 21, wherein the guide rail (56) associated with the front shell (22) is made of metal.

25. Support structure in accordance with claim 21, wherein the driving device (54) includes a driving element (70) and a drive rod (72) that is swivel-connected to the driving element (70) and the connecting element (60) of the flap (12).

26. Support structure in accordance with claim 25, wherein the driving element (70) of the driving device (54) is mounted in the front shell (22) of the shell profile (16).

27. Support structure in accordance with claim 25, wherein the driving element (70) of the driving device (54) is mounted on the object (14) surrounded by the flowing fluid.

28. Support structure in accordance with claim 1, wherein at least one further device is installed within the chamber (18) to at least partially receive the device (20) for retracting and extending the flap (12).

29. Use of a support structure (10) in accordance with claim 1 for a landing flap or trailing-edge flap mounted on a mainplane (14) of an aircraft or a flap of a submarine, aerospace aircraft or a flexible flow guidance device in a water/wind tunnel.

30. Support structure in accordance with claim 12, wherein the stiffeners are longitudinal and/or transverse stiffeners.

31. Support structure in accordance with claim 30, wherein the longitudinal and/or transverse stiffeners are arranged within the chamber (18) for at least partially receiving the device (20) for retracting and extending the flap (12).

32. Support structure in accordance with claim 14, wherein the outer shell (34) contains one or more inner walls (46) and/or an intermediate wall (50).

33. Support structure in accordance with claim 14, wherein the front shell (22) and/or the rear shell (24) of the shell profile (16), that has a fluid/aerodynamic form on the outer side, further comprise(s) a closing cover (36) that closes the outer shell (34).

34. Support structure in accordance with 16, wherein the plastic is a fiber-reinforced plastic.

35. Support structure in accordance with 16, wherein the metal material is steel, titanium, aluminum or an alloy of comprising at least one of these.

36. Support structure in accordance with claim 24, wherein the metal is a high-quality material or wear-resistant steel.

37. Support structure in accordance with claim 24, wherein the metal is titanium or a titanium alloy.

38. Support structure in accordance with claim 24, wherein the at least one further device is a fuel jettison system or a ram air turbine.

\* \* \* \* \*